3,438,913
Patented Apr. 15, 1969

3,438,913
PROCESS FOR ETHERIFICATION AND GELATINIZATION OF STARCH
Erling T. Hjermstad, Cedar Rapids, Iowa, assignor to Penick & Ford, Limited, New York, N.Y., a corporation of Delaware
No Drawing. Continuation-in-part of applications Ser. No. 143,062, Oct. 5, 1961, and Ser. No. 163,856, Jan. 2, 1962. This application May 11, 1965, Ser. No. 454,976
Int. Cl. C08b *19/04, 19/02, 25/02*
U.S. Cl. 260—17.3
8 Claims

ABSTRACT OF THE DISCLOSURE

A process for preparing highly cross-linked, etherified starches which are capable of being fully gelatinized by special cooking procedures, said products having low biochemical oxygen demand (B.O.D.) and being useful as sizes for textile yarns. The process is a combination of steps involving crosslinking to the point of insolubilization with specific crosslinking agents, etherification to a relatively high substitution level while still obtaining a filterable product and heating the starch under specific alkali or acid conditions to achieve full gelatinization.

---

This invention relates to a process for etherification and gelatinization of starch. The process is particularly adapted for producing highly etherified filterable starches, such as low B.O.D. starches which can be employed as warp sizes and for similar purposes.

This application is a continuation-in-part of my copending applications, Ser. No. 143,062, filed Oct. 5, 1961, now abandoned and Ser. No. 163,856, filed Jan. 2, 1962, now abandoned.

An important application of etherified starch is in its use as a size for textile warp yarns. Starches and modified starches have been used for many years to size warp yarns in order to give them greater strength and resistance to abrasion during weaving. The size is removed from the woven cloth and often discarded by discharging into rivers and streams. Ordinary starch is subject to rapid bacteria decomposition, and this can result in a lowering of the oxygen content in rivers to the point where fish and the organisms they feed on cannot survive. Extreme pollution with organic material results in replacement of clean water forms of life with pollution-tolerant forms such as maggots, sludge worms, leeches, blue-green algae, and various molds and bacterial. The water is often turbid and malodorous under these conditions.

The capacity of a substance to cause depletion of oxygen when discharged in a stream is proportional to its biochemical oxygen demand. The biochemical oxygen demand (B.O.D.) of sewage, sewage effluents, or industrial wastes, is the quantity of dissolved oxygen required during stabilization of the decomposable organic matter by aerobic biochemical action. Determination of this quantity is accomplished by diluting suitable portions of the sample with water saturated with oxygen and measuring the dissolved oxygen before and after a period of incubation, usually 5 days at 25° C., with suitable bacteria present. Unsubstituted starch exhibits a relatively high B.O.D. within a 5-day incubation period at 25° C. Starch which is etherified to increasing degrees of substitution exhibits a decreasing 5 day B.O.D. value. For example, with an average substitution of about 1 hydroxyethyl group per anhydroglucose unit of starch, 5 day B.O.D. values in the order of one-tenth of that of unsubstituted starch have been obtained. Other types of substitued ether groups also results in lowered B.O.D. values.

The etherification of starch with alkylene oxides and other etherifying agents reacting monofunctionally with starch is most conveniently conducted in an aqueous reaction medium. This is true because the major proportion of starch is produced commercially by separation from other plant constitutents utilizing water suspension processes. Consequently, it is desirable to etherify the water suspension of the native, granule starch prior to dewatering and drying.

The etherification of water suspension of starch is practiced commercially on a large scale in the United States. However, the degree of etherification which can be obtained is quite limited, and while the extent of etherification achieved advantageously modifies the properties of the starch, it is generally insufficient to significantly reduce the B.O.D. values. In large scale commercial operations, it is virtually essential to recover the etherified starch from the water suspension by a filtration operation, and even a relatively slight degree of swelling of the starch may make it non-filterable. While starch can be etherified under conditions of alkalinity and temperature which normally are insufficient to swell the starch to a non-filterable condition, the problem is complicated by the fact that the starch becomes more water soluble and therefore more subject to swelling as the etherification proceeds. Consequently, the etherification of starch and water suspensions has generally been limited to less than 0.1 ether group per anhydroglucose unit ($C_6H_{10}O_5$ mole) of the starch.

There are other factors which complicate the problem. After the separation of the starch from the water suspension by filtration, it is usually desirable to wash the starch with water to achieve a further purification. This operation may also tend to swell the starch. Even if means could be found for preventing the swelling of the starch during the filtration and washing operations, the means would have to be such as not to interfere with the formation of starch paste in which the starch is gelatinized to the dispersed state.

U.S. Patent No. 3,014,901 describes a process where starch is first reacted with cross-linking reagents, such as epichlorohydrin, and subsequently reacted with an etherifying reagent, such as ethylene oxide. While this process provides a means of preparing low B.O.D. textile sizes, the degree of etherification or substitution is limited. Moreover, reaction of the starch with the cross-linking reagent prior to etherification tends to inhibit gelatinization of the starch.

It is, therefore, a principal object of this invention to provide a method of preparing more highly substituted ethers of ungelatinized, filterable starch while suspended in water, and which can be purified by washing with water without swelling the starch derivative to the unfilterable state. Another important object is the production of highly substituted ungelatinized starch ethers which can be readily and fully gelatinized to the granule dispersed state to form pastes suitable for commercial uses as adhesives, sizes, coatings, etc. Further objects and advantages will be indicated in the following:

It has been discovered that the above objects can be achieved by a novel process for the etherification and gelatinization of starch. It has been discovered that when specific cross-linking reagents are employed for reaction with starch that the reaction can be continued until the starch has a high degree of insolubility without making the starch permanently insoluble and preventing subsequent gelatinization thereof. By virtue of the high degree of etherification obtained in the cross-linking step, the starch can be reacted with an etherifying agent to a high level of substitution without swelling the starch to a non-filterable state. Subsequently, however, by special gelatinization procedure under non-neutral pH conditions, fully gelatinized starch paste can be formed for use as sizes and in other applications. Heretofore, it has been assumed that bifunctional reagents which cross-link starch permanently inhibit gelatinization. While permanent insolubilization is the general rule which applies to most common cross-linking reagents such as epichlorohydrin, it has now been discovered that starch may be temporarily cross-linked with divinyl sulfone and urea-formaldehyde can be broken or dissolved during the cooking of the starch by using appropriate non-neutral pH conditions, alkaline conditions being preferred for divinyl sulfone cross-link starch, and acid conditions for urea-formaldehyde cross-link starch.

In practicing the present invention, the native granule starch, preferably in the form of a water suspension, is reacted with the starch cross-linking reagent under non-swelling conditions of alkalinity and temperature. The process may be illustrated by divinyl sulfone, which is preferred because of its ease of reacting with starch and the low proportion required to insolubilize starch. The divinyl sulfone reacts with the hydroxyls of the starch to form a cross-link. The formation of cross-linkages reduces the water solubility of the starch, and thereby tends to prevent it from swelling to a non-filterable state.

Divinyl sulfone,

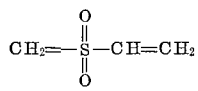

reacts readily with ungelatinized granule starch in alkaline water suspensions to impart increasing insolubility in water with increasing proportion of reagent which is reacted. By this means ungelatinized starch can be made sufficiently insoluble to enable etherification to a relatively high level of substitution with monofunctional etherifying agents in alkaline water suspensions, and the product, which is still in the ungelatinized, native granule form, can be dewatered on a filter and washed to remove salts and side reaction products. The relatively highly-substituted divinyl sulfone cross-linked product resists gelatinization or passing under neutral conditions, but it can be gelatinized to form a normal paste by heating in water under alkaline conditions. This result is believed to be due to breaking of the sulfone bond in the cross-linked product by the action of aqueous alkali.

The present invention offers several distinct advantages in the production of relatively highly-substituted starch ethers. The etherification can be conducted in water suspensions of starch in simple closed tanks, such as the tanks which are normally used for starch treatment in the wet-milling industry, and the products dewatered and washed to a high degree of purity on filters which are normally used for purification of ungelatinized starch, and dried in regular starch drying equipment, for example, continuous, tunnel dryers. The product is obtained in the original, ungelatinized granule form and can be conveyed and packed in shipping containers without further grinding, if desired. Since the product is readily filterable and washable, the salt and side reaction products can be reduced to extremely low proportions. Etherification reactions with starch are generally exothermic. Excess heat is readily removed when the reaction is conducted in water. When conducting etherification reactions in water suspensions, uniform distribution of etherifying agent and alkali is readily accomplished and the resulting starch ethers tend to be uniformly substituted. The present process therefore affords maximum convenience and economy in the production of relatively highly substituted starch ethers.

Any type or variety of starch or starch containing material in which the starch exists in the form of cold-water insoluble, native, ungelatinized granules may be employed. Included are different varieties of starch such as corn, wheat, potato, tapioca, waxy maize, rice, sorghum, and starches having high proportions of the amylose fraction, in either the unmodified state or after treatment with chemicals such as bleaches, acids, alkalis, or oxidizing agents, and which are still in the cold-water insoluble, ungelatinized, native granule form.

The insolubilization step is preferably accomplished by reacting the insolubulizing agent with ungelatinized starch in a water suspension in the presence of suitable catalysts, such as acids or bases, depending on the type of reagent used. However, any reaction conditions which result in an insolubilized, ungelatinized granule starch are suitable. The insolubilization reaction can be conducted over a wide temperature range and in the present process it is preferred to use a temperature below the swelling temperature of the starch. For example, temperatures of from 60 to 125° F. are suitable.

The proportion of insolubilizing agent which is used will depend on the degree of subsequent monofunctional etherification which is desired since the higher degrees of etherification require a greater degree of granule insolubility to prevent swelling than do lower degrees. The degree of granule insolubility which is required also depends on the nature of the substituent ether group which is subsequently introduced, since the more hydrophilic types require a greater degree of granule insolubility to prevent swelling during etherification. Due to the wide range of ether group substitution which is possible by the present process, the range of proportions of insolubilizing agent which is required is also very wide. Generally, when using divinyl sulfone, proportions ranging from 0.1% to 10% based on starch solids can be used. However, a sufficient degree of insolubilization can usually be obtained with from 0.5 to 3% of the divinyl sulfone. When using a ureaformaldehyde resin, proportions ranging from 1% to 15% based on starch solids are preferred.

For the purposes of the present invention the reaction of the starch with the cross-linking reagent should be continued at least until the starch is sufficiently insolubilized that it settles out after soaking at 5% concentration in 1% aqueous sodium hydroxide for 30 minutes at 75° F. It will be understood that the concentration of the starch is to be on a dry weight basis and that the concentration of the sodium hydroxide solution is also on a weight basis. To insure uniform contacting of the starch with aqueous sodium hydroxide, mild agitation may be employed during the soaking period. For example, the starch suspension can be agitated for 3 minutes and then allowed to soak for another 27 minutes under the specified conditions. Starch which is insolubilized sufficiently for the purposes of the present invention, settles out of the NaOH solution and leaves a layer of clear supernatant liquid at the top. Starches which are not sufficiently insolubilized, gelatinize or swell under these conditions to a viscous paste and no settling occurs.

After the insolubilization reaction is completed, the starch suspension where necessary is adjusted to the desired alkalinity to promote etherification reactions by various types of etherifying agents. Any type of monofunctional etherifying agent which reacts with alkaline starch granules to produce partial ethers may be used. These include the following: epoxide etherifying agents like the mono epoxy alkanes or mono epoxy alkanes containing other functional groups which are not reactive to alkaline starch, for example, ethylene oxide, propylene oxide, butylene oxide, 1,2 epoxy butene, styrene oxide, dialkylamino propylene oxide, and other mono epoxides containing an oxygen linked to adjacent carbon atoms; monohalogen substituted alkanes, alkenes, or alkynes or monohalogen substituted alkanes containing other functional groups which are not reactive to alkaline starch, for example, methyl chloride or bromide and higher homologs, allyl and methylallyl chloride or bromide, propargyl chloride or bromide, benzyl chloride or bromide, sodium mono chloroacetate, sodium mono chloropropionate, dialkylamino ethyl chloride, monohalohydrins, and other mono halogen substituted reagents; alkyl sulfates, for example, dimethyl and diethyl sulfate; and unsaturated compounds capable of reacting with the hydroxyl groups of starch by 1–4 addition, for example, acrylonitrile, acrylamide, or acrylate esters.

The above etherifying agents require varying degrees of alkalinity in the starch suspension to promote reasonable reaction rates. The epoxides are highly reactive and do not consume alkali as they react. It is therefore necessary only to maintain the starch suspension in an alkaline state during the reaction. In the present process, the use of from 0.1% to 2.0% NaOH or equivalent alkali based on starch solids is preferred when reacting with epoxides. Reactions of starch with unsaturated compounds such as acrylonitrile and acrylamide require conditions of alkalinity similar to those of epoxide reactions. Etherifying agents such as mono halogen substituted compounds and alkyl sulfates consume alkali as the reagent is hydrolyzed. Therefore the total amount of alkali present during starch etherifications with those reagents should be at least sufficient to provide for complete hydrolysis. It is also necessary to provide an excess of alkali to carry such reactions to completion. In the present process, the use of an excess of NaOH or equivalent alkali of 0.1% to 2.0% based on starch solids is preferred, though higher proportions may be added, especially when etherifying a starch with a high degree of insolubilization.

Starch swelling inhibitors such as neutral alkali metal salts, may also be present during the insolubilization step and during etherification. While the use of such salts is not essential in the present process, they help prevent swelling especially when using low degrees of insolubilization. The use of a salt as a diluent for alkali is also beneficial during addition of alkali, since the salt helps prevent localized gelatinization of the starch while the alkali is being distributed throughout the starch suspension.

The desired proportion of etherifying agent may be added to the starch suspension all at once or in separate increments. The temperature at which the etherification is conducted can vary widely, though higher rates of reaction are obtained as the temperature is raised. The maximum temperature which can be used will depend on the degree of insolubilization of the starch, the degree of ether group substitution which is obtained, and the alkalinity of the suspension. In the present process a reaction temperature range of 70–15° F. is preferred, though not essential in all variations of the process. It will be understood that the conditions of temperature and alkalinity should be controlled to promote the etherification reaction without swelling the starch to a non-filterable state.

When the desired proportion of etherifying agent has been reacted, the starch suspension is dewatered in a filter and washed with water to remove salts and side-reaction products. The starch may be neutralized with acid before purification or left in the alkaline state. The filter cake can be dried in normal starch drying equipment.

The products obtained by the present process of etherification of insolubilized granule starch do not gelatinize to any substantial extent when heated in water under neutral conditions. However, they may be gelatinized to form pastes suitable for sizing or adhesives by cooking at elevated temperatures under non-neutral pH conditions. While the alkalinity or acidity temperature, and time required for obtaining an adequate degree of gelatinization depends on the degree and type of insolubilization and the degree and type of ether group substitution in the product. Alkali (e.g., NaOH) solutions having concentrations ranging from 0.1 to 4% can be used to secure gelatinization of the divinyl sulfone cross-linked products. Preferably, the divinyl sulfone cross-linked products are cooked in water containing from 1 to 3% alkali (e.g., NaOH) by weight based on the starch. Lesser amounts of alkali can be used where the starch is cooked with steam under super atmospheric pressure. The use of pressure cooking equipment for gelatinizing the insolubilized etherified products is advantageous in that the lower proportions of alkali will result in lower proportions of salt in the pastes after neutralizing the alkali. Several types of starch pressure cookers are available and are in use by manufacturers who require starch pastes in their processes.

The products which are insolubilized with urea-formaldehyde can also be gelatinized by heating in water at a relatively low pH. Generally, a suspension pH below 5.0 is desirable. As the pH is lowered, there is a greater tendency for the starch ether product to become depolymerized at elevated temperatures. A suspension pH of around 3.0 has been found to be especially suitable. Heating the starch-ether products which have been insolubilized with urea-formaldehyde at pH 2.5–3.5 at 210–212° F. in water results in gelatinization without undue depolymerization or "thinning" of the paste.

A very wide range of proportions of substituent ether groups may be introduced into the insolubilized starch. In the present process, it is generally desirable to introduce at least 0.2 ether group per anhydroglucose unit. From 0.2 to 1.0 mole of ether group per $C_6H_{10}O_5$ mole of starch may be introduced, though the process is not necessarily limited to the maximum proportion. The proportion to be used depends on the product characteristics which are desired. For achieving low B.O.D. starches, it is preferred to substitute in excess of 0.5 ether group per anhydroglucose unit.

As the ether group substitution is increased, the resistance of the starch to decomposition due to bacterial action is increased. Etherification of starches with non-hydrophobic groups increases the hydration characteristics, decreases retrogradation and gelling characteristics of the gelatinized pastes, and results in increased film smoothness, clarity, and flexibility.

The present process therefore provides a method of economically producing low B.O.D. materials suitable for warp sizing in the textile industry. During recent years the need for such materials has become great due to legislation requiring abatement of stream pollution.

The etherified products are also suitable for other applications. The improved water holding properties of their pastes and improved smoothness or continuity of their films make them ideally suited for use in paper sizing and coating. Starch ethers containing other functional groups exhibit affinity for various types of surfaces. For example, introduction of ether groups containing nitrogenous radicals results in greater adhesion to hydrophobic fibers when used as a warp size. Ether groups containing hydrophobic radicals can be introduced into the starch to modify the filming effects obtained in the sizing of textiles and paper. Other uses include adhesives, liquid glues, laundry starch, etc., wherein the improved paste stability and resistance to gelling or set-back is beneficial.

The present invention in both its process and product aspects is illustrated by the following specific examples.

Example 1

To a 41% solids suspension of commercial, unmodified corn starch was added a mixture of 30% NaOH and 26%

NaCl containing 1.5% NaOH based on starch solids and 4% NaCl based on initial water in the suspension. Two percent by weight of divinyl sulfone based on starch solids was added and the suspension agitated for 4 hours at 100° F. The suspension was then diluted with water to a concentration of 20% by weight starch solids. Ethylene oxide was added incrementally and the suspension agitated in a closed vessel at 100° F. The reaction was continued until the purified starch product analyzed 12.3% by weight of hydroxyethyl groups by the modified alkoxyl procedure of P. W. Morgan which is described in "Industrial and Engineering Chemistry," Analytical Edition, vol. 18, p. 500 (1946). This is equivalent to .5 hydroxyethyl groups per anhydroglucose unit.

The suspension was then neutralized with acid, dewatered on a suction filter, washed with water until substantially free of salts and side reaction products, and dried. The hydroxyethyl starch product was obtained as a white powder containing starch ether in the original granule form. This product swelled only slightly and did not gelatinize when heated in neutral water to 210° F. It gelatinized to the degree of dispersion of a normal starch paste when heated at 210° F. in water with 1–3% by weight of NaOH on starch. When gelatinized in aqueous alkali, it formed a colorless, transluscent, cohesive, non-gelling paste which dried to form fairly clear, smooth, and flexible films.

An alkali-gelatinized paste of the product was neutralized with acid and used in a typical formulation for sizing cotton warp yarns. With a normal proportion of size pickup, the dried, sized yarns showed excellent resistance to abrasion.

The biochemical oxygen demand (B.O.D.) of the gelatinized and neutralized product when incubated for 5 days at 25° C. in the presence of typical bacterial organisms was determined by the method given in "Standard Methods for the Examination of Water, Sewage, and Industrial Wastes," 10th edition, pp. 260–266, published by the American Public Health Association, Inc., New York, N.Y. The 5-day B.O.D.'s of commercial, unmodified corn starch and corn starch which had been reacted with 2% by weight of divinyl sulfone were also determined. The hydroxyethyl ether product gave a 5-day B.O.D. which was 17% of that given by unmodified cornstarch which was run as a control. The starch reacted with 2% by weight of divinyl sulfone gave a 5-day B.O.D. of 94% of that given by unmodified corn starch.

Example 2

Commercial, unmodified corn starch was reacted by the process of Example 1 with 3% by weight of divinyl sulfone and sufficient ethylene oxide was reacted incrementally until the purified product contained 18.6% by weight of hydroxyethyl groups by analysis. This was equivalent to .82 ether group per anhydroglucose unit. The product was dewatered in a suction filter and washed until substantially free of salts and side reaction products. The alkali-gelatinized and neutralized paste of the product gave a B.O.D. of 8.1% of that of unmodified corn starch which was run as a control.

Example 3

Commercial, unmodified corn starch was reacted by the process of Example 1 with 5% by weight of divinyl sulfone and 30% by weight of propylene oxide based on starch solids. This was equivalent to .82 mole of propylene oxide per $C_6H_{10}O_5$ mole starch. The propylene oxide reaction was conducted in a closed vessel at 100° F. for 120 hours. The product was dewatered in a suction filter, washed substantially free of salts and side reaction products, and dried to a white powder consisting of hydroxypropyl starch in the native granule form. The alkali-gelatinized acid neutralized paste of this product showed a B.O.D. of 4.4% of that of unmodified corn starch which was run as a control.

Example 4

Commercial, unmodified corn starch was reacted by the process of Example 1 with 5% by weight of divinyl sulfone and 30% by weight of 1,2 epoxy butane based on starch solids. This was equivalent to .66 mole of 1,2 epoxy butane per $C_6H_{10}O_5$ mole of starch. The reaction with 1,2 epoxy butane was conducted at 100° F. for 120 hours. The product was dewatered in a suction filter, washed substantially free of salts and side reaction products, and dried to a white powder consisting of hydroxybutyl starch in the native granule form. The alkali-gelatinized and neutralized paste of this product showed a B.O.D. of 23.8% of that of unmodified corn starch which was run as a control.

Example 5

To a 41.8% solids suspension of unmodified corn starch was added a mixture of 30% NaOH and 26% NaCl containing 1.5% NaOH based on starch solids and 4% NaCl based on initial water in the suspension. Five percent by weight of divinyl sulfone based on starch solids was added and the suspension agitated at 125° F. for 5 hours. The suspension was diluted to 20% starch solids with water containing 10.3% NaOH based on starch solids. 30% by weight of sodium monochloracetate based on starch solids was added and the suspension agitated at 100° F. for 72 hours. Titration of an aliquot with standard acid indicated that 22% by weight of sodium monochloracetate based on starch had been hydrolyzed. This is equivalent to .41 mole of sodium chloracetate per $C_6H_{10}O_5$ mole of starch. The suspension was neutralized with acid, dewatered on a suction filter, the product washed until substantially free of salts and side reaction products, and dried. The alkali-gelatinized and neutralized paste of the product showed a B.O.D. of 19.7% of that of unmodified corn starch which was run as a control.

Example 6

Commercial, unmodified potato starch was reacted according to the process of Example 1 with 1% by weight of divinyl sulfone and 20% by weight of ethylene oxide based on starch solids. The ethylene oxide reaction was conducted in a closed flask at 100° F. for 48 hours. The product was dewatered in a suction filter, washed substantially free of salts and side reaction products and dried to a white powder consisting of hydroxyethyl starch in its native granule form. When heated in water at 210° F. with 1% NaOH based on the starch, it gelatinized to form a clear, viscous cohesive paste.

Example 7

Commercial, unmodified corn starch was reacted according to the procedure given in Example 6 with 5% by weight of divinyl sulfone and 13.5% by weight of acrylonitrile based on starch solids. The acrylonitrile reaction was conducted for 16 hours at 100° F. The suspension was dewatered in a suction filter, washed substantially free of salts and side reaction products, and dried to a powder consisting of cyanoethyl starch in the native granule form. The product was gelatinized to a transluscent, non-cohesive, non-gelling paste by heating in water with 10% NaOH based on starch at a temperature of 210° F.

Example 8

Commercial, unmodified corn starch was reacted according to the process of Example 6 with 3% by weight of divinyl sulfone and 8% by weight of allyl chloride based on starch solids. The allyl chloride reaction was conducted at 100° F. for 50 hours. The suspension was dewatered in a suction filter, washed substantially free of salts and side reaction products and dried to a white powder consisting of allyl starch in the native granule form. The product gelatinized when heated in water at 210° F. with 3% NaOH based on starch to form a translucent, non-gelling paste.

Example 9

To a 42% solids suspension of commercial, unmodified corn starch was added 15% by weight of Urac 180 based on starch solids. This is a urea-formaldehyde resin solution of 66% solids made by American Cyanamid Co., New York, N.Y. The suspension was adjusted to pH 3.0 and agitated at 100° F. for 24 hours. The suspension was then diluted to 20% starch solids concentration with water containing 1.6% NaOH based on starch solids and ethylene oxide was reacted incrementally in a closed vessel at 100° F. until a purified sample of the starch contained 13.2% by weight of hydroxyethyl groups by analysis. This is equivalent to approximately .55 hydroxyethyl groups per anhydroglucose unit. The suspension was neutralized with acid, dewatered on a suction filter, washed substantially free of salt and side reaction products, and dried. The product gelatinized slightly when heated to 210° F. in neutral water, but gelatinized to the degree of dispersion of a normal starch paste when heated at 210° F. in a 4% NaOH solution. A paste of the product gelatinized by heating in water at pH 3.0 and neutralized with NaOH to pH 7.0 gave a B.O.D. of 21% of that of unmodified corn starch which was run as a control.

Example 10

Commercial, unmodified corn starch was reacted with 5% by weight of divinyl sulfone by the method given in Example 5. The suspension was diluted to 20% starch solids by adding water containing 8% NaOH based on the starch. The suspension was agitated in a closed vessel at 100° F. and methylchloride gas introduced at 10–15 p.s.i.g. for 36 hours, during which 9.4% by weight of methylchloride based on starch was reacted. The suspension was dewatered in a suction filter, washed substantially free of salts and side reaction products, and dried to a white powder consisting of methyl starch in the native granule form. The product gelatinized to a translucent, cohesive, non-gelling paste when heated in water at 210° F. with 3% by weight of NaOH based on the starch.

Example 11

To a 40% solids suspension of commercial, unmodified corn starch was added a mixture of 30% NaOH and 26% NaCl containing 1.5% NaOH based on starch solids and 4% NaCl based on initial water in the suspension. Then 0.5% by weight of divinyl sulfone based on starch was added and the suspension agitated at 100° F. for several hours. Next ethylene oxide was added and the suspension was agitated in a closed vessel at 100° F. until analysis of a purified portion indicated that the product had a substitution of 0.218 mole of hydroxyethyl group per $C_6H_{10}O_5$ mole of starch. The suspension was then neutralized with acid, dewatered on a suction filter, washed to remove salts and side reaction products, and dried.

As illustrated by the foregoing examples, the use of divinyl sulfone or urea-formaldehyde as cross-linking agents for starch before etherification to high levels of monofunctional ether group substitution enables the production of highly substituted starch ethers in the original unswollen granule form which can be dewatered and washed on a filter in the same manner as untreated starch. However, such products would have limited commercial significance if they could not be gelatinized and dispersed to pastes suitable for sizing or adhesives. By the method of this application, divinyl sulfone or urea-formaldehyde cross-link starch ethers can be gelatinized by heating in water under non-neutral pH conditions. Under appropriate alkaline or acidic conditions, the cross-links are dissolved or broken and the product gelatinizes to a paste similar to that obtained with uncross-linked or monofunctionally substituted starch. While the exact mechanism is not understood, it appears that the alkali in the case of the divinyl sulfone cross-linked starch attacks the sulfone radical thus breaking the bond between the two ether groups which were attached to the starch during the cross-linking step. An analogous reaction apparently occurs under acidic conditions for the urea-formaldehyde cross-linked starch.

The following additional examples further illustrate the distinctive nature of the process of this invention by comparing cross-linked etherified starches produced by the method of this invention with other cross-linked etherified starches.

Example 12

Unswollen granule starches which had been cross-linked with different cross-linking agents and then reached with high proportions of ethylene oxide were dewatered and washed substantially free of salts and side reaction products. They were suspended in 1% NaOH solution in 5% starch solids concentrations and heated to 210° F. The following results were obtained.

| Cross-linking agent (percent on starch) | Ethylene oxide used (percent on starch) | Extent of gelatinization on heating in 1% NaOH for three hours |
|---|---|---|
| Divinyl sulfone, 1% | 20 | Clear, cohesive paste; all granules dispersed. |
| Divinyl sulfone, 3% | 60 | Do. |
| Divinyl sulfone, 6% | 80 | Do. |
| Phosphorous oxychloride, 1%. | 20 | Slight swelling; opaque suspensions, settles on standing. |
| Epichlorhydrin, 1% | 20 | No significant swelling; settles like raw, untreated starch. |
| Urea-HCHO resin (Urac 180), 10%. | 30 | Slight swelling, opaque suspensions, settles on standing. |

Example 13

Corn starches which had been cross-linked with varying proportions of divinyl sulfone and then reacted with different high proportions of ethylene oxide were dewatered on a filter and washed substantially free of salts and side reaction products. They were suspended in 5% starch concentrations in water containing 1% to 5% NaOH based on starch (0.05% to 0.25% NaOH solutions) at 210° F. The following results were obtained.

| Divinyl sulfone (percent starch) | Ethylene oxide used (percent on starch) | NaOH during cooking | | Time at 210° F. (hr.) | Extent of gelatinization |
|---|---|---|---|---|---|
| | | Percent on starch | Percent on water | | |
| 1.0 | 20 | 1.0 | 0.053 | 1 | Slight swelling, settles part |
| | | 2.0 | 0.105 | 1 | gelatinized, semi-translucent paste. |
| | | 3.0 | 0.16 | 1 | Clear, cohesive paste, all granules dispersed. |
| 2.0 | 40 | 2.0 | 0.105 | 1¼ | Part gelatinized, semi-translucent paste. |
| | | 3.0 | 0.16 | 1¼ | Clear, cohesive paste, all granules dispersed. |
| 3.0 | 60 | 1.0 | 0.053 | 4 | Clear, cohesive paste. |
| | | 2.0 | 0.105 | 2 | Do. |
| | | 4.0 | 0.21 | 1 | Do. |

These data show that divinyl sulfone cross-linked ethers can be gelatinized with heat in water containing extremely low proportions of sodium hydroxide. This is of great importance in the commercial use of these starch products because of the salt which is formed on neutralizing the alkali dispersed pastes. Starch ethers which have been cross-linked with other cross-linking agents, such as phosphorus oxychloride, epichlorhydrin, thermosetting resins, polyhalogen reagents, diepoxy reagents, etc. resist dispersion in hot, 1% aqueous NaOH at 5% starch concentration.

Example 14

Unswollen granule starches which had been insolubilized with different reagents and then reacted with high proportions of ethylene oxide were dewatered and washed substantially free of salts and side reaction products. They were suspended in water in 5% concentrations, adjusted to pH 3.0 and heated for two hours at 210° F. The following results were obtained.

| Insolubilizing agent (percent on starch) | Ethylene oxide used (percent on starch) | Extent of gelatinization in 5% conc. at pH 3.0 for 2 hours at 210° F. |
|---|---|---|
| Urea-HCHO resin (Urac-180) 10%. | 30 | Translucent, non-cohesive paste, most granules dispersed. |
| Divinyl sulfone 2%. | 40 | No significant swelling, settles like raw, untreated starch. |
| Phosphorus oxychloride 1%. | 20 | Do. |
| Epichlorhydrin, 1%. | 20 | Do. |

The above results show that urea-HCHO resin stabilized ethers are fairly easily easily gelatinized under acidic conditions but starch ethers insolubilized with other known cross-linking agents are very resistant to gelatinization under these conditions.

Example 15

Corn starch was acid-converted to 30 alkali fluidity, insolubilized with 10% by weight of urea-HCHO resin (U.F. Concentrate, Allied Chemical Corporation) and then reacted with 40% by weight of ethylene oxide. The product was dewatered on a filter and washed free of salts and side reaction products. The purified product was heated at 210° F. in 12% concentration in water at different pH levels. The following results were obtained.

| pH | Time heated | Extent of gelatinization |
|---|---|---|
| 2.0 | 30 mins | Somewhat low viscosity, translucent paste, granules well dispersed. |
| 3.0 | 30 mins | Translucent, cohesive paste, most of granules dispersed. |
| 4.0 | 2 hours | Do. |
| 5.0 | 2 hours | Cloudy, non-cohesive paste, slight swelling. |
| 6.0 | 2 hours | White suspension, substantially unswollen granules settle out. |

The same product was tested in a Corn Industries Viscometer at different pH levels to determine viscosity characteristics. The results are given below.

| pH | Concentration, percent | Corn industries viscometer, 210 F. bath temp., 60 r.p.m. (gram cm.) | |
|---|---|---|---|
| | | Viscosity after 30 min. | Viscosity after 60 min. |
| 2.5 | 12 | 580 | 320 |
| 3.0 | 12 | 880 | 544 |

The above data show that this product can be gelatinized at pH 2.5 or 3.0 without undue loss in viscosity due to acidic deploymerization during gelatinization. These pastes are, therefore, suitable for commercial application as sizes and adhesives.

While in the foregoing specification a number of specific embodiments have been set forth for purpose of illustration and many details have been given for purpose of clarity, it will be apparent to those skilled in the art, however, that the invention is susceptible to other embodiments and that certain of the details set forth herein can be varied considerably without departing from the basic principles of the invention.

I claim:
1. A process for the etherification and gelatinization of starch, comprising reacting native granule starch in a water suspension with a starch cross-linking reagent, said cross-linking reagent being selected from the class consisting of divinyl sulfone and a ureaformaldehyde resin, continuing said reaction until said starch is sufficiently insolubilized that it settles out after soaking said starch at 5% concentration in 1% aqueous sodium hydroxide for 30 minutes at 75° F., reacting said insolubilized starch with an etherifying agent reacting monofunctionally with starch to form a starch ether derivative, said etherification reaction being carried out in a water suspension without swelling said starch to a non-filterable state and being continued until said starch contains at least 0.2 ether group per anhydroglucose unit, separating the etherified starch from said suspension by filtration, and thereafter heating the starch product thrus obtained in water, said water having an alkali concentration of from 0.1 to 4% alkali by weight when said starch product has been cross-linked with said divinyl sulfone and being at an acid pH of below 5.0 when said starch product has been cross-linked with said ureaformaldehyde said heating being continued until most of the granules of said starch are dispersed and said starch is substantially fully gelatinized.

2. The process of claim 1 in which said etherifying agent is an epoxide etherifying agent, and in which said etherification is continued until said starch contains at least 0.5 ether group per anhydroglucose unit.

3. The process of claim 1 in which said cross-linking reagent is divinyl sulfone.

4. The process of claim 1 in which said cross-linking reagent is a urea-formaldehyde resin.

5. A process for the etherification and gelatinization of starch, comprising reacting native granule starch in a water suspension with divinyl sulfone, said divinyl sulfone agent being employed in proportions of from 0.1 to 10% by weight based on the starch solids, continuing said reaction until said starch is sufficiently insolubilized that it settles out after soaking said starch at 5% concentration in 1% aqueous sodium hydroxide for 30 minutes at 75° F., reacting said insolubilized starch with an etherifying agent reacting monofunctionally with starch to form a starch ether derivative, said etherification reaction being carried out in a water suspension without swelling said starch to a non-filterable state and being continued until said starch contains at least 0.5 ether group anhydroglucose until, separating the etherified starch product from said suspension by filtration, and later heating said starch product in water having an alkali concentration of from 0.1 to 4% alkali by weight, said heating being continued until most of the granules of said starch are dispersed and said starch is substantially fully gelatinized.

6. The process of claim 5 in which said starch product is gelatinized in water containing from 1 to 3% sodium hydroxide by weight based on the starch product.

7. A process for the etherification and gelatinization of starch, comprising reacting native granule starch in a water suspension with a urea-formaldehyde resin, said urea-formaldehyde resin being employed in proportions of from 0.1 to 10% by weight based on the starch solids, continuing said reaction until said starch is sufficiently insolubilized that it settles out after soaking said starch at 5% concentration in 1% aqueous sodium hydroxide for 30 minutes at 75° F., reacting said insolubilized starch with an etherifying agent reacting monofunctionally with starch to form a starch ether derivative, said etherification reaction being carried out in a water suspension without swelling starch to a non-filterable state and being continued until said starch contains at least 0.5 ether group per anhydroglucose unit, separating the etherified starch product from said suspension by filtration, and later heating said starch product in water at an acid pH of below 5.0 said heating being continued until most of the granules of said starch are dispersed and said starch is substantially fully gelatinized.

8. The process of claim 7 in which said starch product is gelatinized in water having a pH of about 2.5 to 3.5.

References Cited

UNITED STATES PATENTS

| | | | |
|---|---|---|---|
| 2,524,400 | 10/1950 | Schoene et al. | 260—233.3 |
| 3,014,901 | 12/1961 | Gill et al. | 260—233.3 |
| 3,065,222 | 10/1962 | Bullock et al. | 260—233.3 |
| 3,069,410 | 12/1962 | Smith et al. | 260—233.3 |

DONALD E. CZAJA, *Primary Examiner.*

R. W. MULCAHY, *Assistant Examiner.*

U.S. Cl. X.R.

260—233.3